US009055536B2

(12) United States Patent
Venkatachari et al.

(10) Patent No.: US 9,055,536 B2
(45) Date of Patent: Jun. 9, 2015

(54) APPARATUS AND METHOD OF ULTPC REJECTION THRESHOLD OPTIMIZATION IN WCDMA FOR POWER CONTROL ALGORITHM 2

(71) Applicant: QUALCOMM Incorporated, San Diego, CA (US)

(72) Inventors: Harish Venkatachari, San Diego, CA (US); Wei Zhang, Santa Clara, CA (US); Nate Chizgi, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 14/038,252

(22) Filed: Sep. 26, 2013

(65) Prior Publication Data

US 2014/0248920 A1   Sep. 4, 2014

Related U.S. Application Data

(60) Provisional application No. 61/771,452, filed on Mar. 1, 2013.

(51) Int. Cl.
*H04B 7/00* (2006.01)
*H04W 52/18* (2009.01)
*H04W 52/56* (2009.01)
*H04W 52/14* (2009.01)
*H04W 52/40* (2009.01)

(52) U.S. Cl.
CPC ............ *H04W 52/18* (2013.01); *H04W 52/146* (2013.01); *H04W 52/40* (2013.01); *H04W 52/56* (2013.01); *Y02B 60/50* (2013.01)

(58) Field of Classification Search
CPC ..... H04W 52/18; H04W 52/40; H04W 42/56; H04W 52/146
USPC ........................................................ 455/522
See application file for complete search history.

(56) References Cited

U.S. PATENT DOCUMENTS

| 2004/0166884 | A1 | 8/2004 | Oh et al. | |
|---|---|---|---|---|
| 2004/0202243 | A1* | 10/2004 | Lin et al. ........................ | 375/227 |
| 2013/0072250 | A1 | 3/2013 | Zhang et al. | |
| 2013/0114577 | A1 | 5/2013 | Cai et al. | |
| 2013/0115998 | A1 | 5/2013 | Lamm et al. | |
| 2013/0322332 | A1* | 12/2013 | Tsai .............................. | 370/328 |

OTHER PUBLICATIONS

International Search Report and Written Opinion—PCT/US2014/018698—ISA/EPO—May 21, 2014, 13 pages.

(Continued)

*Primary Examiner* — Wesley Kim
*Assistant Examiner* — Raj Chakraborty
(74) *Attorney, Agent, or Firm* — Arent Fox LLP

(57) ABSTRACT

Techniques for uplink transmit power command (ULTPC) rejection threshold optimization in WCDMA for power control algorithm 2 (PCA2) are described. Uplink transmit power control commands may be received on a five-slot interval. The uplink transmit power control commands may be decoded for each of the five slots. The decoded uplink transmit power control commands may be compared for each of the five slots to a threshold. The threshold may be optimized to minimize overall transmit power control decision error. A bit decision may be made for each of the five slots based on the comparison and an overall transmit power control command may be determined based on the bit decision for each of the five slots over the five-slot interval.

14 Claims, 4 Drawing Sheets

(56) References Cited

OTHER PUBLICATIONS

ETSI TS 125 214 V11.6.0 (Jul. 2013) Universal Mobile Telecommunications System (UMTS); Physical layer procedures (FDD) (3GPP TS 25.214 version 11.6.0 Release 11).

Panchal, A., et al. Modified Adaptive Step Size Power Control Algorithm for WCDMA, International Journal of Computer Architecture and Mobility, vol. 1—Issue 8, Jun. 2013.

Nokia Siemens Networks, Channel Estimation and Power Control Rate Impact on HSUPA System Performance, 3GPP TSG RAN WG1 Meeting #68-bis, Mar. 26-30, 2012.

LG Electronics: "Problem in the uplink power control algorithm 2 and the solutions," 3GPP Draft; R1-030498_LGE_PCA2, 3rd Generation Partnership Project (3GPP), Mobile Competence Centre; 650, Route des Lucioles; F-06921 Sophia-Antipolis Cedex; France, vol. RAN WG1, no. Paris. France; May 14, 2003, XP050097618, pp. 1-6 (6 pages).

Nortel Networks: "On the Reliability of the Emulated Small Step Size During Soft Handover," 3GPP Draft; R1-99C27, 3rd Generation Partnership Project (3GPP), Mobile Competence Centre; 650, Route des Lucioles ; F-06921 Sophia-Antipolis Cedex; France, vol. RAN WG1, no. Hannover; Sep. 14, 1999, XP050089776, pp. 1-4 (4 pages).

\* cited by examiner

APPARATUS AND METHOD OF ULTPC REJECTION THRESHOLD OPTIMIZATION IN WCDMA FOR POWER CONTROL ALGORITHM 2

CLAIM OF PRIORITY UNDER 35 U.S.C. §119

The present application for patent claims priority to Provisional Application No. 61/771,452 entitled "APPARATUS AND METHOD OF ULTPC REJECTION THRESHOLD OPTIMIZATION IN W-CDMA for POWER CONTROL ALGORITHM 2" filed Mar. 1, 2013, which is assigned to the assignee hereof and hereby expressly incorporated by reference herein.

BACKGROUND

1. Field

Aspects of the present disclosure relate generally to wireless communication systems, and, more particularly, to apparatus and methods of uplink transmit power control (ULTPC) rejection threshold optimization in WCDMA for power control algorithm 2 (PCA2).

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In a typical wireless communication environment, RF signal transmissions between a base station (e.g., Node B in UMTS) and user equipment (UE) are subject to degradation, such as path loss, shadow fading and multipath, which typically may be caused by such factors as terrain contours (e.g., mountains, forests), environment (e.g., urban or rural), propagation medium (e.g., dry or moist air), changes in distance between a base station (e.g., Node B) and a mobile UE, and/or the like. Transmit power of the UE is typically controlled by uplink (UL) Transmit Power Control (TPC) commands that are sent from the Node B to the UE through a downlink (DL) channel. For example, when a Node B attempts to maintain a signal-to-interference ratio (SIR) target for received signals from the UE, the Node B sends the ULTPC commands to the UE based on how an estimated SIR of a received signal compares to the SIR target. The UE decodes these ULTPC bits (e.g., where a "−1" represents a "down" or reduce power command, "1" represents an "up" or increase transmit power command, and a "0" represents a "hold" command) and adjusts the transmit power accordingly.

The UE can decode a TPC command using one of two algorithms: Power Control Algorithm 1 (PCA1) or Power Control Algorithm 2 (PCA2) as required by the base station. The main difference between the two algorithms is that in PCA1, a UE decodes ULTPC on a per slot basis, while in PCA2, a UE decodes ULTPC on a five-slot interval (also referred to as a five-slot cycle or five-slot period), such that a bit decision is made for each of the five slots and then an overall ULTPC decision is made based on the bit decision for each of the five slots. Since power adjustment is less frequent under PCA2, e.g., once every five slots versus once every slot, TPC command decoding errors and rejections may have a larger impact on transmit power than under PCA1. Both errors and rejections take longer to recover from under PCA2 than under PCA1. For example, a rejection of an overall ULTPC command (which may be referred to as TPC_cmd) decision delays the power adjustment request from Node B by five additional slots. As such, UL throughput may be adversely affected if too many of the ULTPC bit decisions are inaccurate, e.g., there are errors in decoding too many of the bits during the five-slot interval. Further, low rejection rates of bit decisions, e.g., accepting untrustworthy bit determinations, also may negatively affect UL throughput.

Moreover, in a multi-cell situation, such as a soft handover, PCA2 provides that transmit power may be reduced if a single TPC command from one cell is "−1" or "down." This may referred to as "or-of-down" processing. However, in order to increase transmit power, TPC commands from more than half (e.g., 50%) of the cells need to be "1" or "up." In a situation where one cell is relatively untrustworthy (e.g., the cell is weak and is not providing a strong enough signal for the UE to accurately determine its TPC command outside of a given margin of error), and the UE decodes a ULTPC command from that cell as indicating a transmit power decrease (e.g., "−1"), while a second cell that is more trustworthy indicates a transmit power increase (e.g., "1"), PCA2 provides that the overall TPC command should be decoded as "down." As such, if the trustworthy cell truly needed the power increase, but did not get it due to the PCA2 multi-cell requirement, the UE may miss, or drop, a call resulting in a decrease in user experience.

Thus, improvements in TPC command decoding are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method for controlling transmit power at a user equipment is described. The method may include receiving uplink transmit power control commands on a five-slot interval. The method may include decoding the uplink transmit power control commands for each of the five slots. The method may include comparing the decoded uplink transmit power control commands for each of the five slots to a threshold. The threshold may be optimized to minimize overall transmit power control decision error. The method may include making a bit decision for each of the five slots based on the comparison. The method may include determining an overall transmit power control command based on the bit decision for each of the five slots over the five-slot interval.

In an aspect, an apparatus for controlling transmit power at a user equipment is described. The apparatus may include means for receiving uplink transmit power control commands on a five-slot interval. The apparatus may include means for decoding the uplink transmit power control commands for each of the five slots. The apparatus may include means for comparing the decoded uplink transmit power control commands for each of the five slots to a threshold. The threshold may be optimized to minimize overall transmit power control decision error. The apparatus may include means for making a bit decision for each of the five slots based on the comparison. The apparatus may include means for determining an overall transmit power control command based on the bit decision for each of the five slots over the five-slot interval.

In an aspect, a computer program product for controlling transmit power at a user equipment is described. The computer program product may include a computer-readable medium comprising code. The code may cause at least one computer to receive uplink transmit power control commands on a five-slot interval. The code may cause at least one computer to decode the uplink transmit power control commands for each of the five slots. The code may cause at least one computer to compare the decoded uplink transmit power control commands for each of the five slots to a threshold. The threshold may be optimized to minimize overall transmit power control decision error. The code may cause at least one computer to make a bit decision for each of the five slots based on the comparison. The code may cause at least one computer to determine an overall transmit power control command based on the bit decision for each of the five slots over the five-slot interval.

In an aspect, an apparatus for controlling transmit power at a user equipment is described. The apparatus may include a transceiver module configured to receive uplink transmit power control commands on a five-slot interval. The apparatus may include a demodulator/decoder configured to decode the uplink transmit power control commands for each of the five slots. The apparatus may include a threshold comparator configured to compare the decoded uplink transmit power control commands for each of the five slots to a threshold. The threshold may be optimized to minimize overall transmit power control decision error. The apparatus may include a bit decision module configured to make a bit decision for each of the five slots based on the comparison. The apparatus may include a TPC command decision module configured to determine an overall transmit power control command based on the bit decision for each of the five slots over the five-slot interval.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
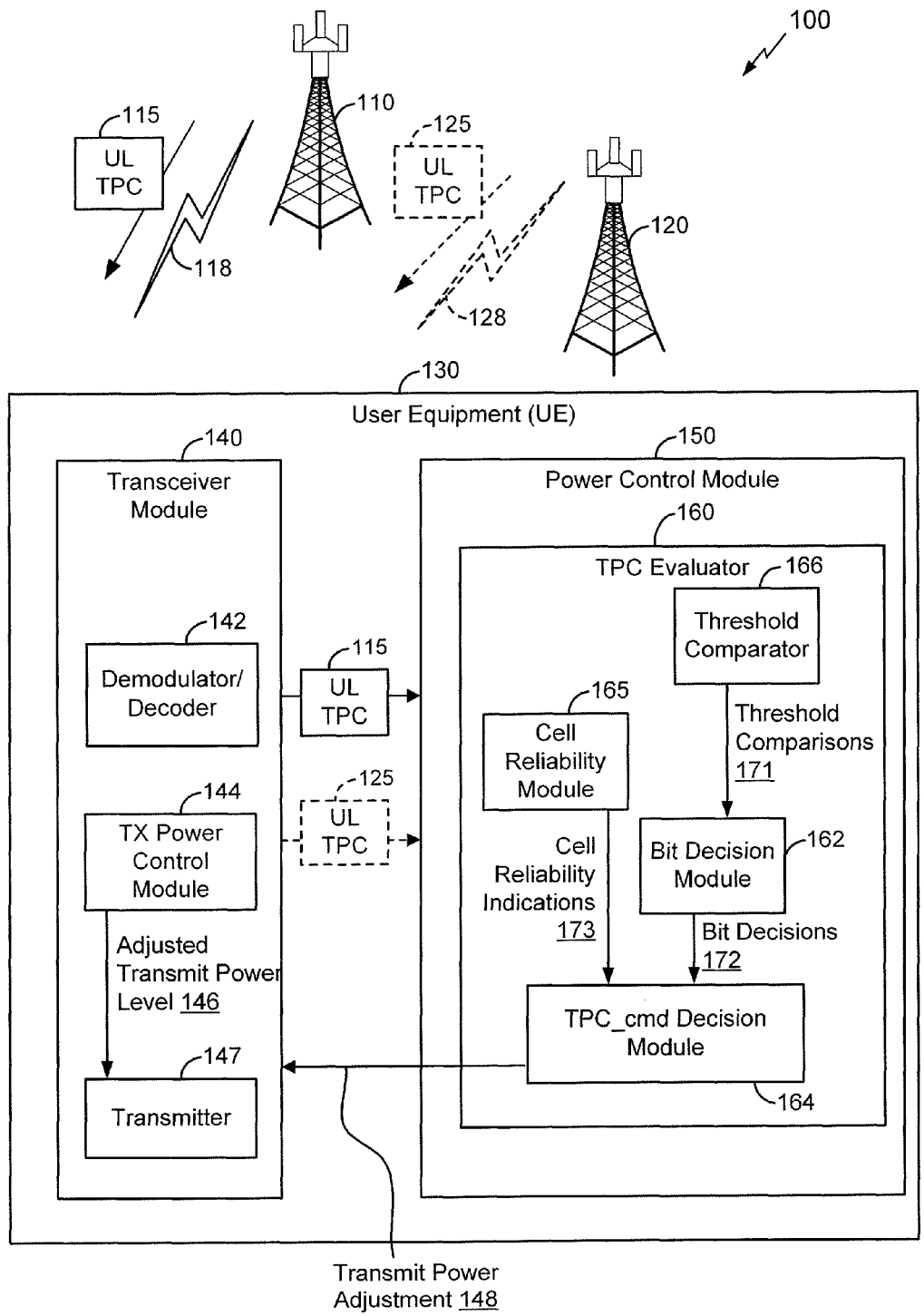
FIG. 1 is a block diagram illustrating an example of a wireless communication system in which two base stations (e.g., Node Bs) are communicating with a user equipment (UE) having aspects configured to optimize an uplink transmit power control (ULTPC) rejection threshold in WCDMA for power control algorithm 2 (PCA2)

Referring to FIG. 1, in a wireless communication system 100 having aspects configured to optimize an uplink transmit power control (ULTPC) rejection threshold in WCDMA for power control algorithm 2 (PCA2), one or more cells or base stations, such as, for example, Node B 110 and Node B 120, are communicating with a user equipment (UE) 130. UE 130 may include a power control module 150 configured, via TPC evaluator 160, to accurately decode ULTPC commands 115 and 125 from Node B 110 and Node B 120, respectively. It should be noted that, in some aspects, UE 130 may only be in communication with a single Node B, such as Node B 110; in other aspects, such as, for example, in a soft handover scenario, UE 130 may be in communication with more than one Node B, such as Node B 110 and Node B 120. UE 130 may operate power control module 150 in either case to improve decoding of received ULTPC commands.

In an aspect, UE 130 may include a transceiver module 140 and a power control module 150. Transceiver module 140 may include radio frequency (RF) circuitry for sending/receiving RF signals to/from base stations, such as Node B 110 and/or Node B 120. In particular, transceiver module 140 may be configured to receive ULTPC commands, such as TPC command 115 from Node B 110 and TPC command 125 from Node B 120, on respective downlink (DL) channels 118 and 128, which may be Dedicated Physical Channels (DPCHs).

Transceiver module 140 may include a demodulator/decoder 142, which may be configured to demodulate and/or decode ULTPC commands, such as one or both of ULTPC command 115 and ULTPC command 125, depending on whether UE 130 is in communication with Node B 110 alone, in which case ULTPC command 115 may be received by UE 130 and demodulated and/or decoded, or UE 130 is in communication with both Node 110 and Node B 120 (e.g., in a multi-cell or soft cell handover scenario), in which case ULTPC command 115 and ULTPC command 125 may be received by UE 130 and demodulated and/or decoded. For purposes of the example of FIG. 1 and the present discussion, it will be assumed that UE 130 is in communication with both Node B 110 and Node B 120 such that UE 130 receives, and demodulates and/or decodes, ULTPC command 115 and ULTPC command 125.

Each ULTPC command may include a bit having a value that represents how UE 130 is to adjust its transmit power 146. For example, if the bit has a value of "−1," the bit represents a "down" or reduce power command. If the bit has a value of "1," the bit represents an "up" or increase transmit power command. If the bit has a value of "0," there may be an undetermined or unreliable decoding of the bit and, as such, a bit having a value of "0" may represent a hold command (e.g., UE 130 should not adjust transmit power 146). Transceiver module 140 may be configured to demodulate and/or decode each bit within each ULTPC command in order to determine a value represented by the bit (e.g., "−1," "1," or "0"). In an aspect, because UE 130 is operating according to power control algorithm 2 (PCA2) (as described in detail below), Transceiver module 140 may be configured to demodulate and/or decode each of the five bits of each ULTPC command 115 and 125. As such, transceiver module 140 may be configured to forward the demodulated and/or decoded ULTPC commands 115 and 125, which may include, for example, determined values for each of the five bits associated with each of ULTPC commands 115 and 125, to power control module 150.

Power control module 150 may be configured to control transmit power 146 of UE 130 based on the demodulated and/or decoded ULTPC commands 115 and 125 received from transceiver module 140. In an aspect, for example, power control module 150 may include TPC evaluator 160, which includes threshold comparator 166, bit decision module 162, and TPC command (TPC_cmd), decision module 164. In an aspect, and optionally, TPC evaluator 160 also may include cell reliability module 165. TPC evaluator 160 may receive demodulated and/or decoded ULTPC commands 115 and 125 from transceiver module 140. Upon receipt thereof, TPC evaluator 160 may be configured to evaluate the demodulated and/or decoded ULTPC commands 115 and 125 according to one or more power control algorithms (PCAs). For example, and as discussed herein, the one or more power control algorithms may be those generally described in 3GPP Technical Specification 25.214, subsection 5.1.2.2, which is publicly available. More particularly, Power Control Algorithm 2 (PCA2) is discussed in subsection 5.1.2.2.3 of TS 25.214 and Power Control Algorithm 1 (PCA1) is discussed in subsection 5.1.2.2.2 of TS 25.214. In particular, and according to the present aspects, TPC evaluator 160 may be configured to execute PCA2 to evaluate ULTPCs in a five-slot interval. Upon receiving the five bits of the decoded ULTPC command 115 from the five-slot interval from Node B 110, and optionally the decoded ULTPC command 125 in the five-slot interval from Node B 120 (e.g., in the multi-cell or soft handover scenario), threshold comparator 166 may be configured to compare each of the bits to a threshold according to PCA2 and output a threshold comparison 171 to bit decision module 162 for each bit.

In the present aspects, the threshold may be optimized to minimize overall transmit power control decision error. In one aspect, the threshold may be optimized if a UE, such as UE 130, is receiving TPC commands from a single cell, such as Node B 110. In another aspect, the threshold may be optimized if a UE, such as UE 130, is receiving TPC commands from multiple cells (e.g., during a soft handover), such as Node B 110 and Node B 120. To determine the threshold, a tradeoff may be made between rejections (both of individual bits and an overall TPC command) and errors (both of individual bits and an overall TPC command). It may be understood that a large number of errors in determining values for individual TPC command bits and/or errors in determining a value for an overall TPC command may lead to unacceptable delays because recovering from errors under PCA2 takes much more time than under PCA1 due to the five-slot interval used in PCA2 decision-making. It also may be understood that more rejections can result in fewer errors because an increased number of determinations are not trusted, and, as such, fewer mistakes may be made by ignoring (e.g., rejecting) such untrustworthy determinations. However, a very high number of rejections may paralyze a system such that any changes in transmit power may occur infrequently compared to actual transmit power adjustments signaled by the respective Node B. As such, a tradeoff, characterized by the threshold, may be made to minimize errors and also minimize rejections. The threshold may be used to configure TPC evaluator 160 to apply this tradeoff to the evaluation of TPC command bits (e.g., first via threshold comparator 166 and then via bit decision module 162) and make a determination of an overall TPC command (e.g., via TPC_cmd decision module 164).

For example, as compared to a correct interpretation of a ULTPC command, and according to the present aspects, an error in evaluating a ULTPC bit may lead to a 2 decibel (dB) difference in the transmit power of UE 130, while a rejection may lead to a 1 dB difference in the transmit power of UE 130. As such, and in one aspect, the threshold may be determined by minimizing a transmit power error metric that includes doubling a number of overall TPC command errors, $P_{error}$, and adding an overall hold rate, $P_{hold}$. This transmit power error metric may be described by the formula 2 dB*$P_{error}$+1 dB*$P_{hold}$. Further, and in an aspect, various threshold values may be tested relative to actual and/or simulated ULTPC commands in various high and low geometry scenarios (e.g., high and low signal-to-noise ratio scenarios) and RF channel scenarios. Based on the testing, the threshold may be determined in a way that serves to minimize the function 2 dB*$P_{error}$+1 dB*$P_{hold}$. As such, in an aspect, the threshold may be chosen such that reducing errors enjoys a higher priority than reducing rejections. However, and in an aspect, the threshold also may be selected to ensure that the rejection rate may not become too large such that any gains due to a lower error rate are lost due to an unacceptable infrequency of power adjustments. In an aspect, the threshold may be preconfigured by UE 130 (e.g., threshold comparator 166), the Node B 110, Node B 120, and/or some other network entity (not shown). In another aspect, the threshold may be dynamically configurable by UE 130 (e.g., threshold comparator 166) or one of Node B 110, Node B 120, and/or some other network entity (not shown) based on current network conditions and/or system configurations.

Bit decision module 162 may be configured to receive threshold comparison 171 for each bit and, based thereon, determine a bit decision for each of the five slots. For example, each bit decision may be to accept or to reject the bit of the ULTPC command as decoded and/or demodulated by demodulator/decoder 142 and based on the threshold comparison 171. Once each bit decision is made for the overall ULTPC commands 115 and 125, bit decision module 162 may be configured to provide bit decisions 172 for each of the five bits of ULTPC command 115 and 125 to overall TPC_cmd decision module 164.

Thus, in either a single-cell or multi-cell scenario, threshold comparator 166 and bit decision module 162 may analyze received, decoded (and/or demodulated) ULTPC commands according to PCA2 while also utilizing an optimized threshold that serves to minimize overall transmit power control error, such as by minimizing the formula 2 dB*$P_{error}$+1 dB*$P_{hold}$.

TPC_cmd decision module 164 may be configured to receive bit decisions 172 from bit decision module 162. Upon receipt of the bit decisions 172, TPC_cmd module 164 may be configured to make an overall TPC command (TPC_cmd) determination according to PCA2 or a modified version thereof based on the set of bit decisions for the five-slot interval. For example, for the bit decisions generated by bit decision module 162 resulting from the analysis of the respective ULTPC commands from each Node B, TPC_cmd decision module 164 may be configured to generate an overall TPC command (TPC_cmd) determination, which may indicate that UE 130 should to increase a level or value of transmit power 146, decrease the level or value of transmit power 146, or hold (or otherwise not change) transmit power 146. Based on the overall TPC_cmd determination (e.g., up, down, or hold), TPC_cmd decision module 164 may generate a transmit power adjustment 168.

In one aspect, and for example, TPC_cmd decision module 164 operating according to PCA2 obtains each of the five bit decisions 172 based on the optimized threshold (as described herein) from bit decision module 162, and determines the overall TPC_cmd decision (e.g., transmit power adjustment 168). For instance, in such a case, TPC_cmd decision module 164 determines the overall TPC_cmd decision based on the ULTPC commands from a respective Node B to be up (or down) if and only if all the non-rejected ULTPC bits in the five slots are up (or down), otherwise the overall TPC_cmd decision for the commands from the respective Node B will be a hold (e.g., no adjustment to transmit power 146).

In another aspect, for example, TPC evaluator 160 may execute a first modified PCA2 algorithm, which includes a ULTPC command reliability factor, in combination with the optimized threshold described herein. For instance, in such a case, the present aspects may be described as a first modified PCA2 algorithm that enables the overall TPC_cmd decision to be based on at least one reliable ULTPC command in the five slots, as opposed to being based on all of the non-rejected ULTPC commands in the five slots. For example, cell reliability module 165 may be configured to determine that at least one ULTPC command meets one or more command reliability factors. For example, the one or more command reliability factors may include, but are not limited to, one or any combination of a given signal-to-interference ratio (SIR), a given traffic-to-pilot ratio, and/or some other ULTPC command reliability metric. As such, cell reliability module 165 may be configured to provide a reliability indication 173 for each cell (e.g., Node B 110 and Node B 120) to TPC_cmd decision module 164. In one non-limiting example, the reliability indication 173 may indicate that a cell is reliable (e.g., a "positive" indication) or that a cell is unreliable (e.g., a "negative" indication).

In this aspect, because a Node B is configured to provide the same TPC command bit in each slot over the five-slot interval (according to PCA2), TPC_cmd decision module 164 may determine that at least one bit of the five bits may be used to determine overall TPC_cmd decision when the at least one bit may be reliably determined, e.g., when the cell reliability indication 173 for the particular Node B related to the at least one bit is "positive" or "reliable." In an example, if up to four bits of ULTPC command 115 provided by Node B 110 to UE 130 are rejected, but at least one bit may be reliably determined (e.g., a reliability indication 173 associated with Node B 110 is "positive"), then TPC_cmd decision module 164 may determine that the overall TPC command has the value of the reliably-determined single bit.

In another aspect associated with a multi-cell scenario (e.g., UE 130 receives ULTPC command 115 from Node B 110 and ULTPC command 125 from Node B 120), for example, TPC_cmd decision module 164 may execute the standard PCA2 algorithm, or one or more modified PCA2 algorithms, in combination with the optimized threshold described herein. In this aspect, and under the standard PCA2 algorithm and based on the optimized threshold described herein, TPC_cmd decision module 164 may be configured to use an "or-of-down" algorithm to determine an overall TPC command based on an overall TPC_cmd decision for each of the Node Bs 110 and 120. Because the overall TPC_cmd decision for each Node B is only a part of the determination of an overall TPC_cmd decision for both Node Bs, the overall TPC_cmd decision for each Node B (at this stage in the aspect) may be referred to as a "temporary" TPC_cmd decision. As such, a temporary TPC_cmd decision made be made by TPC_cmd decision module 164 corresponding to each of the multiple Node Bs. Once the temporary TPC_cmd decisions are determined for each of the Node Bs in communication with UE 130 (e.g., Node B 110 and Node B 120), and using the standard PCA2 algorithm, TPC_cmd decision module 164 may be configured to determine the overall TPC_cmd decision to be "down" (e.g., "−1") when any of the temporary TPC_cmd decisions is a down decision. TPC_cmd decision module 164 may be configured to determine the overall TPC_cmd decision as "up" (e.g., "1") when more than 50% of the temporary TPC_cmd decisions indicate "up." Otherwise, the TPC_cmd decision module 164 may be configured to determine the overall TPC_cmd decision as "hold" (e.g., "0").

In another example, TPC_cmd decision module 164 may be configured to use a second modified PCA2 algorithm where the "or-of-down" algorithm is changed, relative to the standard, and used in combination with the optimized threshold described herein, to determine an overall TPC command. In this case, the second modified PCA2 algorithm, which may be a modified "or-of-down" algorithm, may use a cell unreliability condition to exclude from the algorithm a temporary TPC_cmd decision from any unreliable or untrustworthy cell or Node B. In this case, cell reliability module 165 may be configured to determine whether a cell or Node B should be deemed unreliable and/or untrustworthy based on one or more cell unreliability conditions. For example, the one or more cell unreliability conditions may include, but are not limited to, one or any combination of a high transmit power control command rejection rate (as compared to some configurable (e.g., pre-configured or dynamic) acceptable value), a low received pilot energy (as compared to configurable some acceptable value), a low traffic-to-pilot ratio (as compared to some configurable acceptable value), and/or some other cell reliability metric. As such, cell reliability module 165 may generate and output to TPC_cmd decision module 164 a cell reliability indication 173 for each cell. The cell reliability indication 173 may be "positive" to indicate that the cell is reliable or "negative" to indicate that the cell is unreliable.

TPC_cmd decision module 164 may be configured to receive cell reliability indication 173 from cell reliability module 165. If a cell or Node B is determined to be unreliable and hence untrustworthy (e.g., the cell has a cell reliability indication 173 of "negative"), then as a result of executing the second modified PCA2 algorithm having the modified "or-of-down" algorithm, TPC_cmd decision module 164 may be configured to ignore the temporary TPC_cmd decision corresponding to the unreliable cell or Node B when making the overall TPC command determination. For instance, in the case of a soft handover between a reliable Node B (e.g., Node B 110) associated with a temporary TPC_cmd decision to increase power, and an unreliable Node B (e.g., Node B 120) associated with a temporary TPC_cmd decision to decrease power, according to conventional techniques, TPC_cmd decision module 164 will exclude the unreliable "down" command from unreliable Node B 120 and not decrease a level of transmit power 146 (e.g., because no "down" commands exist). However, according to the present aspects, the TPC_cmd decision determined by TPC_cmd decision module 164 will be to increase a level of transmit power 146 according to the command of reliable Node B 110 (e.g., because greater than 50% of the commands, e.g., 1 out of 1, exist).

Thus, and in any case, the TPC_cmd decision module 164 may be configured to output (as transmit power adjustment 168) a "−1" or "down" decision, a "1" or "up" decision, or a "0" or "hold" decision to maintain a current transmit power. In an aspect, when the overall TPC_cmd decision is a "0" or "hold", TPC_cmd decision module 164 may not generate and/or not output transmit power adjustment 168.

Power control module 150 (via TPC_cmd decision module 164 and/or TPC evaluator 160) may be configured to provide transmit power adjustment 168 to transceiver module 140, where a transmit power control module 144 may generate an adjusted transmit power level 146, which may be provided to a transmitter 147 configured to transmit data from UE 130 to the network.

Figure 2:
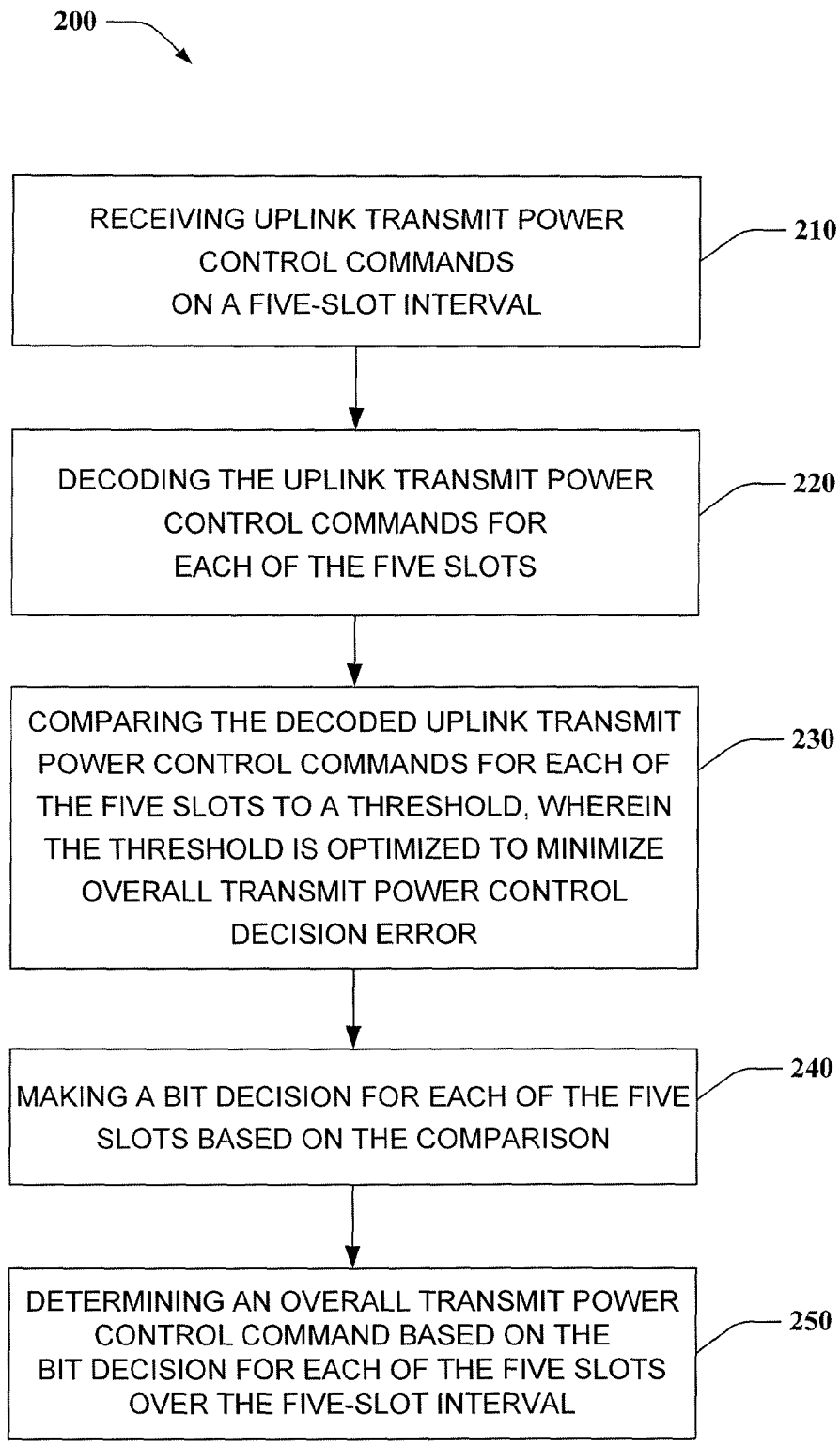
FIG. 2 is a flow chart illustrating an example of a method for minimizing transmit power control decision error according to the present aspects.

Referring to FIG. 2, aspects of a method 200 for controlling transmit power at a user equipment and minimizing transmit power control decision error may be performed by UE 130 of FIG. 1. More particularly, transceiver module 140 (which includes demodulator/decoder 142, transmit power control module 144, and transmit power 146) and/or power control module 150 including TPC evaluator 160 (which, in the present aspect, includes threshold comparator 166, bit decision module 162, and TPC_cmd decision module 164), all of FIG. 1, may be configured to perform aspects of the method 200.

At 210, method 200 may include receiving uplink (UL) transmit power control (TPC) commands on a five-slot interval. For example, PCA2 provides that TPC processing is performed by a UE on a five-slot interval such that a determination of an overall TPC command is made every five slots. As such, an overall TPC command may be based on a combination of bit decisions made for the five bits (e.g., one bit per slot). In one example, UE 130 and/or transceiver module 140 may be configured to receive one set of ULTPC commands 115 from a Node B 110. In another example, and when UE 130 is operating in a multi-cell or soft handover scenario, UE 130 and/or transceiver module 140 may be configured to also receive an additional set of ULTPC commands 125 from a second Node B 120. For purposes of the non-limiting example of FIG. 2, and the present discussion, it will be assumed that UE 130 is in communication with both Node B 110 and Node B 120 of FIG. 1 such that UE 130 receives both ULTPC command 115 and ULTPC command 125.

At 220, method 200 may include decoding ULTPC commands for each of the five slots. In one example demodulator/decoder 142 of FIG. 1 may be configured to demodulate and/or decode (e.g., read) ULTPC commands 115 and 125. Demodulator/decoder 142 may be configured to communicate the demodulated and/or decoded ULTPC commands 115 and 125 to power control module 150 of FIG. 1.

At 230, method 200 may include comparing the decoded ULTPC commands for each of the five slots to a threshold. As described herein, a threshold may be optimized to minimize errors in the determination of an overall transmit power control decision. The threshold may be determined by minimizing a transmit power error metric described by doubling a number of overall TPC command errors, $P_{error}$, and adding an overall hold rate, $P_{hold}$. More particularly, the transmit power error metric may be described by the for $2\ dB*P_{error}+1\ dB*P_{hold}$. As such, the threshold may be determined to minimize the formula $2\ dB*P_{error}+1\ dB*P_{hold}$ and, as such, a higher priority may be given to reducing errors over a goal of reducing rejections. However, and in an aspect, the threshold also may be configured to ensure that the rejection rate may not become too large. As such, and in an aspect, threshold comparator 166 of FIG. 1 may be configured to compare the demodulated and/or decoded ULTPC commands 115 and 125 (as received from transceiver module 140) to the threshold as a first aspect of determining whether to accept or reject the decoded value of each bit of ULTPC commands 115 and 125. Threshold comparator 166 may be configured to generate and output threshold comparison 171, to indicate the results of the comparison of each bit to the threshold, to bit decision module 162.

At 240, method 200 may include making a bit decision for each of the five slots based on the comparing. In one example, bit decision module 162 of FIG. 1 may be configured to receive threshold comparison 171 for each bit. Based thereon, bit decision module 162 may be configured to make a bit decision for each of the five bits of each of ULTPC commands 115 and 125. The bit decisions may be to either accept or reject each bit of the ULTPC commands.

At 250, method 200 may include determining an overall TPC command (TPC_cmd) based on the bit decision for each of the five slots over the five-slot interval. In one example, bit decision module 162 may be configured to provide bit decisions 172 to TPC_cmd decision module 164 of FIG. 1. TPC_cmd decision module 164 may be configured to determine the overall TPC command based on the bit decisions 172 for each of the five bits for each of ULTPC commands 115 and 125. In one example, the TPC_cmd decision module 164 may output (as transmit power adjustment 168) a "−1" or "down" decision, a "1" or "up" decision, or a "0" or "hold" decision. In an aspect, if TPC_cmd decision module 164 determines an overall TPC command decision of "0" or "hold," TPC_cmd decision module 164 may not generate and/or output transmit power adjustment 168.

Optionally (not shown), method 200 also may include adjusting a level of transmit power based on the determined overall TPC command. In one example, power control module 150, TPC evaluator 160, and/or TPC_cmd decision module 164 may be configured to provide transmit power adjustment 168 to transceiver module 140, where transmit power control module 144 may be configured to generate an adjusted transmit power level 146 for UE 130 based on transmit power adjustment 168. Transmit power control module 144 also may be configured to provide adjusted transmit power level 146 to transmitter 147 configured to transmit data from UE 130 to the network based on the adjusted transmit power level 146.

Figure 3:
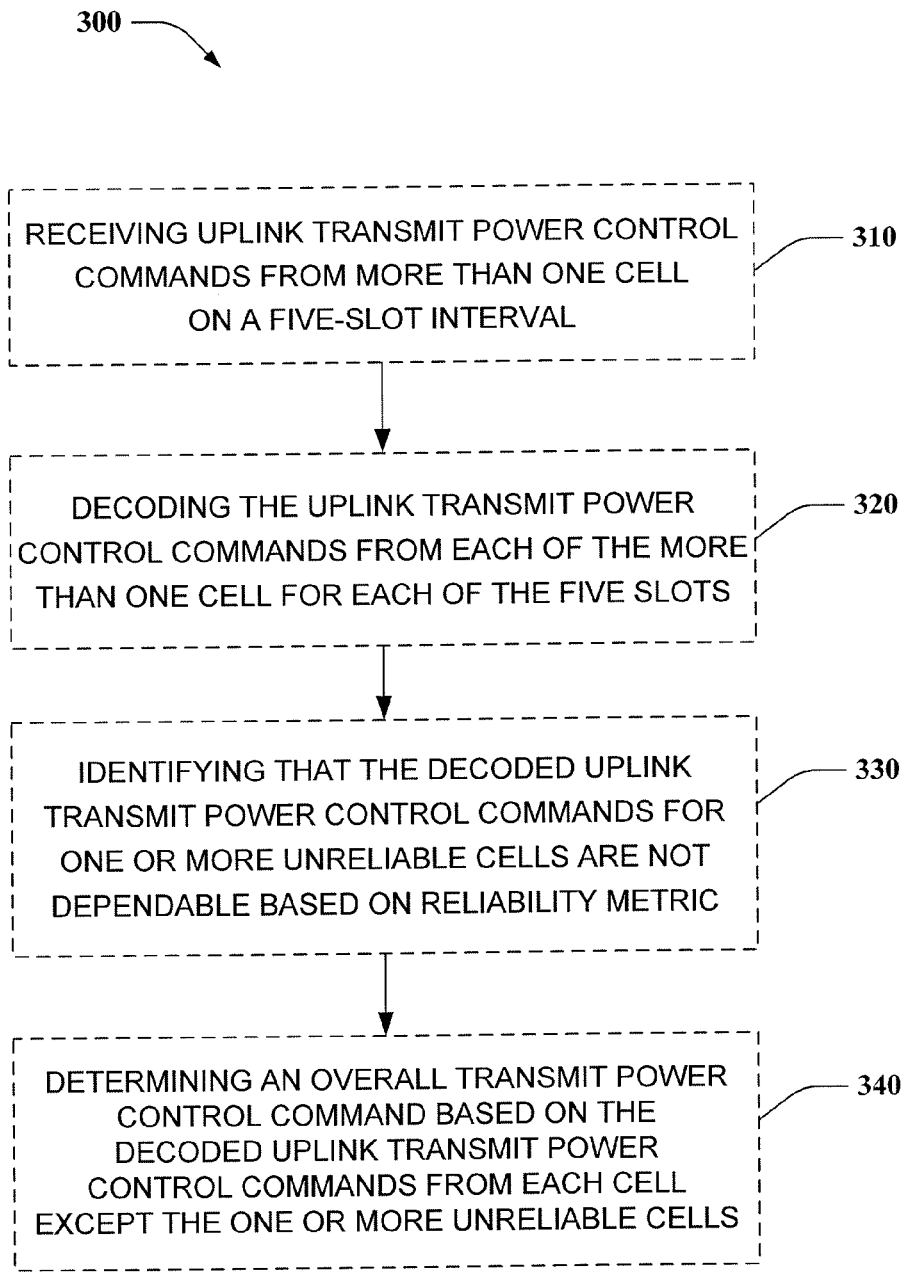
FIG. 3 is a flow chart illustrating an example of a method for minimizing transmit power control decision error in a multi-cell environment according to the present aspects.

Referring to FIG. 3, aspects of a method 300 for controlling transmit power at a user equipment and minimizing transmit power control decision error in a multi-cell environment may be performed by UE 130 of FIG. 1 when UE 130 is in communication with more than one base station, such as Node B 110 and Node B 120 of FIG. 1. UE 130 may be in communication with multiple base stations for any reason including, in one non-limiting example, a soft handover from one base station to another, such as, for example, from Node B 110 to Node B 120. More particularly, transceiver module 140 (which includes demodulator/decoder 142, transmit power control module 144, and transmit power 146) and/or power control module 150 including TPC evaluator 160 (which, in the present aspect, includes threshold comparator 166, bit decision module 162, cell reliability module 165, and TPC_cmd decision module 164), all of FIG. 1, may be configured to perform aspects of the method 300. In an aspect, method 300 may be performed in addition to, or instead of, aspects of method 200 as described with respect to FIG. 2.

At 310, method 300 may include receiving uplink (UL) transmit power control (TPC) commands from more than one cell on a five-slot interval. PCA2 provides that TPC processing is performed by a UE on a five-slot interval such that a determination of an overall TPC command is made every five slots and, thus, an overall TPC command may include five bits (e.g., one bit per slot). In one example, UE 130 may receive ULTPC commands 115 and 125 from Node B 110 and Node B 120, respectively, of FIG. 1.

At 320, method 300 may include decoding the ULTPC commands from each of the more than one cell for each of the five slots. In one example demodulator/decoder 142 of FIG. 1 may be configured to demodulate and/or decode (e.g., read) ULTPC commands 115 and 125. Demodulator/decoder 142 may be configured to communicate the demodulated and/or decoded ULTPC commands 115 and 125 to power control module 150 of FIG. 1.

At 330, method 300 may include identifying that the decoded ULTPC commands for one or more unreliable cells are not within, or dependable based on, a reliability metric. In an aspect, and for example, TPC_cmd decision module 164 may be configured to use a second modified PCA2 algorithm where the "or-of-down" algorithm is changed, relative to the standard, in combination with the optimized threshold described herein, to determine an overall TPC command. In this case, cell reliability module 165 may be configured, according to the second modified PCA2 algorithm having the modified "or-of-down" algorithm, to consider a cell unreliability condition to exclude from the algorithm a temporary TPC_cmd decision from a cell or Node B that is deemed to unreliable or untrustworthy. In this case, cell reliability module 165 may be configured to determine that a cell or Node B is unreliable and/or untrustworthy based on one or more cell unreliability conditions. For example, the one or more cell unreliability conditions may include, but are not limited to, one or any combination of a high transmit power control command rejection rate (as compared to an acceptable value), a low traffic-to-pilot ratio (as compared to an acceptable value), and/or some other cell reliability metric. As such, and according to the second modified PCA2 algorithm having the modified "or-of-down" algorithm, cell reliability module 165 may be configured to determine whether or not one or more unreliable cells or Node Bs may be classified as having a cell unreliability condition (or, conversely, as not having such a condition and thus being reliable). Cell reliability module 165 also may be configured to generate, and communicate to TPC_cmd decision module 164, a cell reliability indication 173 of "positive" (reliable) or "negative" (unreliable) for each cell with which UE 130 is in communication.

At 340, method 300 may include determining an overall TPC command (TPC_cmd) based on the decoded ULTPC commands from each cell except for the one or more unreliable cells. In one example, if a cell or Node B is determined to be unreliable and hence untrustworthy, as indicated by a corresponding cell reliability indication 173 generated by cell reliability module 165 and provided to TPC_cmd decision module 164, then as a result of executing the second modified PCA2 algorithm having the modified "or-of-down" algorithm described herein, TPC_cmd decision module 164 may be configured to ignore a temporary TPC_cmd decision corresponding to the unreliable cell or Node B when making the overall TPC command determination. For instance, in the case of a soft handover between a reliable Node B (e.g., Node B 110) associated with a temporary TPC_cmd decision to increase power, and an unreliable Node B (e.g., Node B 120) associated with a temporary TPC_cmd decision to decrease power, TPC_cmd decision module 164 may be configured to generate a transmit power adjustment 168 that indicates that UE 130 should increase its transmit power according to the command of reliable Node B 110 (e.g., because greater than 50% of the commands, e.g., 1 out of 1, exist).

Optionally (not shown), the method 300 may include adjusting a level of transmit power based on the determined overall TPC command. In one example, power control module 150, TPC evaluator 160, and/or TPC_cmd decision module 164 may be configured to provide transmit power adjustment 168 to transceiver module 140, where a transmit power control module 144 may be configured to generate an adjusted transmit power level 146 based thereon. Transmit power control module 144 may further be configured to provide adjusted transmit power level 146 to transmitter 147. Transmitter 147 may be configured to transmit data from UE 130 to the network based on the adjusted transmit power level 146.

Figure 4:
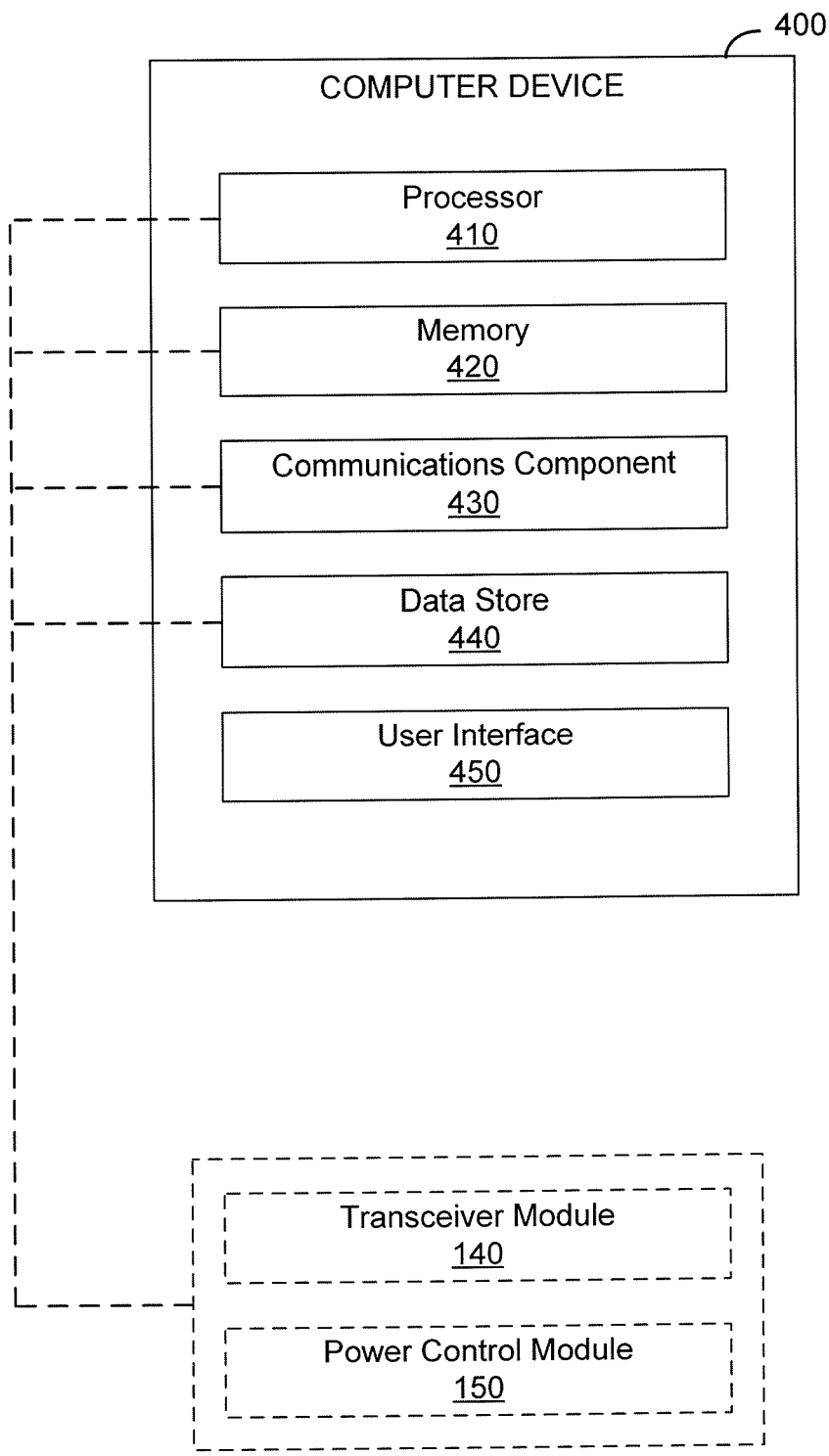
FIG. 4 is a block diagram illustrating an example of a computer device having aspects configured to optimize a ULTPC rejection threshold in WCDMA for PCA2.

Referring to FIG. 4, in one aspect, UE 130, for example, including transceiver module 140 and power control module 150 of FIG. 1, may be represented by a specially programmed or configured computer device 400. In another example, Node B 110 and/or Node B 120 may be represented by specially programmed or configured computer device 400. For example, the special programming or configuring of computer device 400 may be programming or configuring to perform that respective functions described herein for the respective entity, such as for UE 130, including transceiver module 140 and power control module 150 of FIG. 1, and/or for Node B 110 and/or Node B 120.

Computer device 400 includes a processor 410 specially configured to carry out processing functions associated with one or more of components and functions described herein. Processor 410 can include a single processor or multiple sets of processors or multi-core processors. Moreover, processor 410 can be implemented as an integrated processing system and/or a distributed processing system.

Computer device 400 further includes a memory 420, such as for storing data used herein and/or local versions of applications and/or instructions or code being executed by processor 410, such as to perform the respective functions of the respective entities described herein. Memory 420 can include any type of memory usable by a computer, such as random access memory (RAM), read only memory (ROM), tapes, magnetic discs, optical discs, volatile memory, non-volatile memory, and any combination thereof.

Further, computer device 400 includes a communications component 430 that provides for establishing and maintaining communications with one or more parties utilizing hardware, software, and services as described herein. Communications component 430 may carry communications between components on computer device 400, as well as between computer device 400 and external devices, such as devices located across a communications network and/or devices serially or locally connected to computer device 400. For example, communications component 430 may include one or more buses, and may further include transmit chain components and receive chain components associated with a transmitter and receiver, respectively, or a transceiver, operable for interfacing with external devices.

Additionally, computer device 400 may further include a data store 440, which can be any suitable combination of hardware and/or software, that provides for mass storage of information, databases, and programs employed in connection with aspects described herein. For example, data store 440 may be a data repository for applications not currently being executed by processor 410.

Computer device 400 may additionally include a user interface component 450 operable to receive inputs from a user of computer device 400, and further operable to generate outputs for presentation to the user. User interface component 450 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 450 may include one or more output devices, including but not limited to a display, a speaker, a haptic feedback mechanism, a printer, any other mechanism capable of presenting an output to a user, or any combination thereof. In an additional aspect, a user using the user interface 450 may set one of a first subscription or a second subscription as a dedicated data service (DDS) for the computer device 400.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (WCDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM☐, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for controlling transmit power at a user equipment, comprising:
   receiving uplink transmit power control commands on a five-slot interval;
   decoding the uplink transmit power control commands for each of the five slots;
   comparing the decoded uplink transmit power control commands for each of the five slots to a threshold, wherein the threshold is optimized to minimize overall transmit power control decision error by determining the threshold to prioritize a reduction in transmit power control command determination errors as compared to a reduction in rejections of transmit power control commands;
   making a bit decision for each of the five slots based on the comparison; and
   determining an overall transmit power control command based on the bit decision for each of the five slots over the five-slot interval.

2. The method of claim 1, further comprising determining the threshold to minimize a transmit power error metric comprising two times the overall transmit power control decision error rate over the five-slot interval (2 dB*$P_{error}$) plus an overall hold rate over the five-slot interval (1 dB*$P_{hold}$), such that the threshold minimizes the formula 2 dB*$P_{error}$+1 dB*$P_{hold}$).

3. The method of claim 1, further comprising:
   receiving uplink transmit power control commands from more than one cell on a five-slot interval;
   decoding the uplink transmit power control commands from each of the more than one cell for each of the five slots; and
   identifying that the decoded uplink transmit power control commands for one or more unreliable cells are not dependable based on reliability metric,
   wherein determining the overall transmit power control command comprises determining the overall transmit power control command based on the decoded uplink transmit power control commands from each cell except the one or more unreliable cells.

4. The method of claim 3, wherein the reliability metric is determined based on at least one of a low traffic-to-pilot ratio, or a low received pilot energy of the cell, or a high transmit power control rejection rate.

5. The method of claim 3, wherein the determining an overall transmit power control command further comprises:
   determining a temporary overall transmit power control command for each cell; and
   determining the overall transmit power control command by ignoring the temporary overall transmit power control command for the one or more unreliable cells.

6. The method of claim 3, wherein the determining an overall transmit power control command further comprises:
   determining a temporary overall transmit power control command for each cell;
   identifying that the decoded uplink transmit power control commands for one or more reliable cells are dependable based on reliability metric; and
   determining the overall transmit power control command based on the temporary overall transmit power control command for the one or more reliable cells.

7. An apparatus for controlling transmit power at a user equipment, comprising:
   means for receiving uplink transmit power control commands on a five-slot interval;
   means for decoding the uplink transmit power control commands for each of the five slots;
   means for comparing the decoded uplink transmit power control commands for each of the five slots to a threshold, wherein the threshold is optimized to minimize overall transmit power control decision error by determining the threshold to prioritize a reduction in transmit power control command determination errors as compared to a reduction in rejections of transmit power control commands;
   means for making a bit decision for each of the five slots based on the comparison; and
   means for determining an overall transmit power control command based on the bit decision for each of the five slots over the five-slot interval.

8. A non-transitory computer-readable medium storing computer-executable code for controlling transmit power at a user equipment, comprising:
   code for causing at least one computer to:
   receive uplink transmit power control commands on a five-slot interval;

decode the uplink transmit power control commands for each of the five slots;
compare the decoded uplink transmit power control commands for each of the five slots to a threshold, wherein the threshold is optimized to minimize overall transmit power control decision error by determining the threshold to prioritize a reduction in transmit power control command determination errors as compared to a reduction in rejections of transmit power control commands;
make a bit decision for each of the five slots based on the comparison; and
determine an overall transmit power control command based on the bit decision for each of the five slots over the five-slot interval.

9. An apparatus for controlling transmit power at a user equipment, comprising:
a transceiver module configured to receive uplink transmit power control commands on a five-slot interval;
a demodulator/decoder configured to decode the uplink transmit power control commands for each of the five slots;
a threshold comparator configured to compare the decoded uplink transmit power control commands for each of the five slots to a threshold, wherein the threshold is optimized to minimize overall transmit power control decision error by determining the threshold to prioritize a reduction in transmit power control command determination errors as compared to a reduction in rejections of transmit power control commands;
a bit decision module configured to make a bit decision for each of the five slots based on the comparison; and
a TPC command decision module configured to determine an overall transmit power control command based on the bit decision for each of the five slots over the five-slot interval.

10. The apparatus of claim 9, wherein the threshold comparator is further configured to determine the threshold in order to minimize a transmit power error metric comprising two times the overall transmit power control decision error rate over the five-slot interval (2 dB*$P_{error}$) plus an overall hold rate over the five-slot interval (1 dB*$P_{hold}$), such that the threshold minimizes the formula 2 dB*$P_{error}$+1 dB*$P_{hold}$).

11. The apparatus of claim 9,
wherein the transceiver module is further configured to receive uplink transmit power control commands from more than one cell on a five-slot interval, and
wherein the demodulator/decoder is further configured to decode the uplink transmit power control commands from each of the more than one cell for each of the five slots, and
further comprising a cell reliability module configured to determine that one or more unreliable cells are not dependable based on a reliability metric,
wherein the TPC command decision module being configured to determine the overall transmit power control command comprises the TPC command decision module configured to determine the overall transmit power control command based on the decoded uplink transmit power control commands from each cell except the one or more unreliable cells.

12. The apparatus of claim 11, wherein the cell reliability module is further configured to determine the reliability metric based on at least one of a low traffic-to-pilot ratio, or a low received pilot energy of the cell, or a high transmit power control rejection rate.

13. The apparatus of claim 11, wherein the TPC command decision module being configured to determine the overall transmit power control command comprises the TPC command decision module configured to:
determine a temporary overall transmit power control command for each cell; and
determine the overall transmit power control command by ignoring the temporary overall transmit power control command for the one or more unreliable cells.

14. The apparatus of claim 11, wherein the TPC command decision module being configured to:
determine the overall transmit power control command comprises the TPC command decision module configured to determine a temporary overall transmit power control command for each cell,
receive, from the cell reliability module, an indication that the decoded uplink transmit power control commands for one or more reliable cells are dependable based on reliability metric, and
determine the overall transmit power control command based on the temporary overall transmit power control command for the one or more reliable cells.

* * * * *